Nov. 29, 1966 H. L. DEMOREST 3,288,995
METHOD AND APPARATUS FOR MONITORING RADIOACTIVE CONTAMINATION
OF AIR USING A FILM OF WATER AND A SCINTILLATION DETECTOR
Filed May 28, 1962
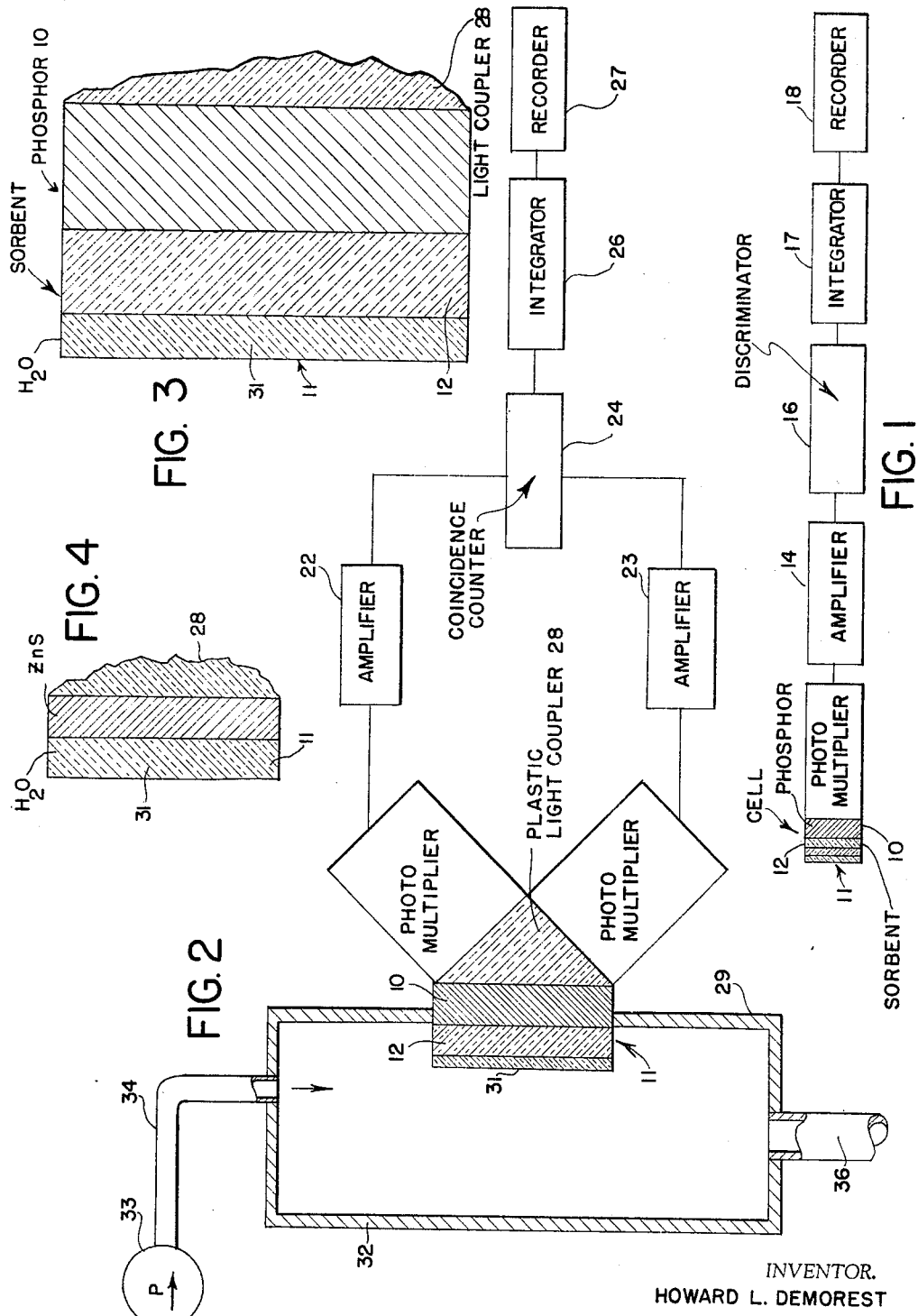
INVENTOR.
HOWARD L. DEMOREST
BY Harold D. Jastram
ATTORNEY

United States Patent Office 3,288,995
Patented Nov. 29, 1966

3,288,995
METHOD AND APPARATUS FOR MONITORING RADIOACTIVE CONTAMINATION OF AIR USING A FILM OF WATER AND A SCINTILLATION DETECTOR
Howard L. Demorest, Minneapolis, Minn., assignor, by mesne assignments, to Litton Systems Inc., Beverly Hills, Calif., a corporation of Maryland
Filed May 28, 1962, Ser. No. 198,169
10 Claims. (Cl. 250—71.5)

This invention relates to a radiation detection apparatus and more particularly to a method of and apparatus for monitoring beta ray activity in air.

With the recent emphasis upon nuclear research and the increased use of radioactive materials in a variety of fields, the problem of radiation monitoring and detection has acquired added importance. Use and manufacture of various radioactive materials often requires that people be exposed either in a particular closed environment of directly exposed to radioactively contaminated air or a contaminated atmosphere containing concentration of radiation emitting materials. This radioactive contamination of the air or environment in which people are working is not necessarily dangerous provided the contamination or radiation level can be continuously monitored and controlled within predetermined safety limits. One example of a material which contaminates the air is tritium which combines with oxygen to form one type of heavy water. This tritium oxide which is formed is dangerous to human beings if taken into the body in excessive quantities.

Because of the low energy of the emitted radiation from tritium oxide, regular monitoring instruments normally will not satisfactorily detect small quantities of tritium or tritium oxide vapor in the air. This is primarily due to the fact that the radiation given off by tritium and tritium oxide is beta ray radiation which is incapable of penetrating more than a few millimeters through metal such as aluminum or iron, but which may be dangerous to humans. Therefore, such rays are blocked before they can be detected by conventional detectors such as ionization chambers. The few instruments which are capable of detecting the presence of tritium in air have certain limitations such as dependence upon the concentration of ions in the air samples and such as response to other than internally produced ionization or ionization which occurs in the immediate atmosphere in which people are working.

It is therefore an object of the present invention to provide a new and improved method and apparatus for detecting radiation.

It is a further object of the present invention to provide a new and improved method and apparatus for continuously monitoring beta ray activities in air.

It is another object of the present invention to provide a method and apparatus for continuously monitoring the tritium contamination in air.

It is another object of the present invention to provide a method and apparatus for continuously detecting the concentration of tritium or tritium oxide in air by collecting a film of tritium contaminated water in the presence of a scintillation material.

A further object of the present invention is to provide a method and apparatus for continuously detecting the concentration of a radioactive contamination in air by collecting a film of contaminated water on a sorbing material in the presence of a scintillation material.

With these and other objects in view, the present invention is more specifically directed to a method and apparatus for detecting the concentration of tritium oxide in air by utilizing a cell containing a water sorbing material in the presence of a scintillation material to collect a thin layer of tritium contaminated water. The collected film of water contains a contamination which is representative of the contamination concentration of tritium or tritium oxide in the air which is flowing past the cell. A photomultiplier tube is utilized to detect the pulses of light generated in the scintillation or phosphor material in response to beta ray bombardment from the contaminated layer of water. Electrical signals generated by the photomultiplier in response to the light signals from the scintillation material are recorded by electrical circuits to correlate the frequency of signals from the photomultiplier with the contamination of the air.

A complete understanding of the invention may be obtained from the following detailed description of a method and an apparatus forming specific embodiments, when read in conjunction with the drawings in which:

FIGURE 1 is a block diagram of a system in accordance with the present invention;

FIGURE 2 is an alternate embodiment of the system disclosed in FIGURE 1 utilizing a pair of photomultipliers to eliminate erroneous readings due to sporadic signals generated in the system;

FIGURE 3 is a detailed cross section of a cell utilized to collect a layer of water from the air; and FIGURE 4 is an alternate embodiment of the cell disclosed in FIGURE 3 where the scintillation material and water layer collecting or sorbing material is composed of the same material.

Referring now to the drawings, and in particular to FIGURE 1, there is shown in block diagram from a detecting and recording system which is used for detecting and recording the concentration of tritium or tritium oxide in air. As shown a layer of phosphor or scintillation material designated generally by the numeral 10, is provided as a beta ray radiation detector. Phosphor layer 10 may be constructed of any suitable scintillation material, for example, inorganic crystalline material such as zinc sulphide, thallium-activated sodium iodide, thallium-activated potassium iodide, calcium tungstate or cadmium tungstate, organic crystalline materials such as naphthalene, anthracene, stilbene, terphenyl or dibenzyl or liquid phosphors such as terphenyl dissolved in toluene contained in a transparent holder. Phosphor layer 10 is a part of cell 11 which is utilized for detecting the presence of radioactive materials in air. Cell 11 also contains a layer of sorbent material for collecting a layer of water contaminated with tritium or tritium oxide. The word sorbent is being used to define a material which is capable of absorbing as well as adsorbing a material such as water vapor from a carrier gas such as air. If the material to be collected as in this case is a layer of water vapor, the sorbent of substrate 12 may be lithium chloride or zinc sulphide. A number of other materials have been used to collect a layer of water from air such as various salts and any of these may be used provided the required layer of water can be formed on the sorbent. If the gas or other material which is to be collected is not water vapor but is a different type of gas, then accordingly a different sorbent will be necessary to collect the particular gas which of interest. Since the concentration of tritium or tritium oxide in the air is the particular contamination which is of interest for the purpose of disclosing the principles of the invention, water vapor and the sorbent for collecting water vapor are the materials used to illustrate the principles of the invention. However, as noted, other types of detecting apparatus which collect different materials or contaminated materials may also be operated according to the principles of this invention.

A photomultiplier tube 13 is preferably positioned adjacent phosphor 10 so that light pulses originating in or generated by the phosphor due to nuclear activity impending thereon may be detected by the photocathode of multiplier tube 13. A transparent window such as a quartz crystal or any other translucent material, may be interposed between phosphor 10 and photomultiplier 13 without substantial decrease in the efficiency of either phosphor 10 or photomultiplier tube 13.

The output of photomultiplier tube 13 is preferably connected to a linear amplifier 14. The output of amplifier 14 in turn is then connected through a discriminator circuit 16 to an integrator network 17 and finally through a recorder arrangement, designated as 18. Since the details of construction of each of the electronic circuits represented by blocks numbered 14, 16, 17, and 18 in FIGURE 1 are well understood in the art, each of these circuits is schematically indicated.

FIGURE 2 is a diagrammatic representation of an alternate form of counter circuit which may be used in place of the circuit illustrated in FIGURE 1. For reasons well understood in the electronic art, it is frequently desirable to provide a coincidence circuit for detecting photoelectric impulses where high temperatures are likely to create sporadic, thermo-emissions from the cathode of a photoelectric multiplier tube. To eliminate this thermal effect, there is shown in FIGURE 2 a pair of photomultiplier tubes 19 and 21, both of which are positioned to detect light pulses originating in phosphor layer 10. The amplified signal from photomultiplier tubes 19 and 21 are respectively transmitted to amplifiers 22 and 23 and the output signals from these amplifiers are applied to a coincidence circuit 24. The output of coincidence circuit 24 may be detected and recorded through integrator circuit 26 and recorder 27. As mentioned in connection with the description of FIGURE 1, the details of each of the electronic circuits shown, blocks 22, 23, 24, 26, and 27, in FIGURE 2 are well understood in the electronic art and for that reason further detailed description of the circuits involved is not considered necessary.

FIGURE 2 is the preferred embodiment of the invention, since it is the more accurate of the type of devices disclosed due to the fact that it eliminates sporadic light signals generated as a result of heat developed in the photomultiplier tubes 19 and 21. The photomultiplier tubes 19 and 21, according to this embodiment, are connected to the detector cell 11 by a plastic light coupler 28 which is transparent to light and which serves as a window for the photocathode of the photomultiplier tubes 19 and 21, respectively. This light coupler 28 permits each photomultiplier tube to simultaneously detect a light pulse which is generated by the scintillation or phosphor material 10 of the detector cell 11 due to bombardment of the scintillation material or phosphor by radiation such as beta particles which in turn are developed as a result of the presence of tritium oxide, the layer of water vapor 31 collected on the surface of the sorbent material of substrate 12. The light coupler 28 may be connected to the cell 11 and to the photomultiplier tubes 19 and 21 by suitable transparent glue which is used for this purpose.

The cell 11 is mounted in the wall 29 of a jacket 32 which is designed to house the cell 11 and to direct a flow of contaminated air past the cell 11 during the monitoring or detection of the concentration of tritium oxide in the air. A pump 33 collects air from the body of air to be monitored and pumps the air through the conduit 34 into the jacket 32 and past the sorbent substrate 12 forming the collecting material of cell 11. The sorbent substrate 12, which is preferably lithium chloride in the case where water vapor is to be collected to form layer 31, is positioned within the jacket 32 so that it is in contact with the air flow through the jacket 32. The sorbent material of substrate 12 collects a layer of water 31, either by adsorption or absorption, as the air moves past the substrate 12 through the exit 36 of jacket 32.

In order that the apparatus may operate as a continuous detection device or a monitor for continuously indicating the concentration of a contaminant like tritium oxide, the sorbent substrate 12 is preferably capable of continuously collecting a layer of water vapor 31 on the surface of the cell 11 which is continuously indicative of the concentration of the contamination in the water vapor flowing past the cell 11. In other words, the sorbent material of substrate 12 is preferably capable of continuously exchanging the water in the layer 31 with that which is flowing past the cell 11 in the air flow from pump 33, otherwise the film 31 would merely build up on the surface of the sorbent substrate 12 and a single reading of the contaminant concentration at the moment that the sorbent substrate 12 is saturated would be the only detection possible. Lithium chloride is an example of a sorbent which may be used in substrate 12 for continuously providing an indication of the concentration of water vapor and likewise the concentration of tritium oxide which is flowing past the cell 11 at any given moment. Lithium chloride exhibits the characteristic of exchanging the water vapor captured in layer 31 with that in the gas flowing past cell 11. It is to be understood that a number of other materials exhibiting the characteristic of LiCl may be utilized for the device such as zinc sulfide. Thus, due to the collection of the layer of water 31 on the surface of the sorbent substrate 12, a continuous indication of the concentration of any contaminant contained in the water vapor is detected by the phosphor material 10 and photomultiplier tubes 19 and 21.

Closed control of the thickness of water layer or film 31 is maintained in order that the low energy beta rays which are emitted by disintegrations in the contaminated water may be satisfactorily detected. Since the exact thickness of the film 31 of water vapor collected on the substrate or sorbent substrate 12 is dependent on the temperature of the air or the substrate 12, and the absolute humidity of the air flowing past cell 11, the precise thickness of the layer 31 which is to be collected can be controlled. If a realistic absolute humidity of 5 grams of water per cubic meter of air is assumed and since the maximum permissible concentration of tritium oxide for continuous intake by humans has been established as $7 \times 10^{-5}$ microcuries per milliliter of air, an activity of $3 \times 10^7$ disintegrations per minute (d.p.m.) per gram of water is the maximum permissible radiation activity level. This $3 \times 10^7$ disintegrations per minute per gram of water is equivalent to an activity level in air of 150 disintegrations per minute per milliliter of air. The detection device then must be capable of monitoring these concentrations of radiation produced due to concentrations of tritium oxide in the air. The tritium oxide may be in the form of HTO or $T_2O$. Excessive intake of either of these forms of tritium oxide in excess concentration in the air is dangerous to humans.

If the layer of water 31 which is collected is .5 micron thick, then 1500 disintegrations per minute per square centimeter of surface might be expected if the concentration of tritium oxide is at a maximum at $7 \times 10^{-5}$ microcuries per milliliter of air. It can be seen from this value that a low efficiency in counting can still result in a detectable signal from the layer 31 of water which is collected on the substrate 12. The maximum energy of a beta particle from tritium is 18 kev. and a beta particle of this energy level will penetrate a film of water of .65 milligram per square centimeter. Since the sorbed film is almost entirely water, assuming that substrate 12 is very thin, with a density equal to 1, the maximum energy particle will penetrate a 6.5 micron film of water. This means that the water layer will be about 6.5 microns thick before total absorption of the emitted beta ray can take place. From these values an optimum thickness of water layer 31 may be chosen. The layer is made thin enough so that beta particles enter the phosphor layer 10 and thick enough so that a detectable level of beta activity is present in the water layer 31. The thickness of water layer 31 is controlled by increasing or decreasing the absolute humidity of the carrier gas or changing the temperature of the substrate. Although the substrate 12 of sorbent and the layer or film 31 of water vapor have been illustrated in FIGURES 2, 3, and 4 as nearly equal in thickness, in actuality the thickness of substrate 12 of sorbent material is extremely small in comparison with the layer 31 of water vapor collected on the surface of cell 11 and for the purposes of calculations the substrate 12 is considered to be nearly zero.

The probable energy of a beta particle emitted from tritium, however, is 10 kev. and assuming this energy level, approximately 37.5% of the emitted beta particles will reach the scintillation or phosphor layer 10 if the thickness of the water layer 31, including the thickness of the sorbent substrate 12, is .5 micron. By maintaining the total thickness of the water vapor layer 31, and the sorbent layer 12 at less than .5 micron, even lower energy beta particles will penetrate through to the phosphor material 10 to produce a light pulse. Thus, the thinner layer of water results in a device capable of detecting even lower concentrations of contaminant in the water vapor or carrier gas which flows past cell 11.

Since the film of water containing the contamination, tritium oxide, is collected directly upon the surface of a thin layer of phosphor 10 which is optically coupled to a photomultiplier tube as shown in FIGURES 1 and 2, the light pulses generated in the phosphor are picked up or detected by the photomultiplier tubes 19 and 21. The beta particles emitted by the tritium in the water layer 31 enter the thin film of phosphor 10 and produce light pulses which are easily detectable by photomultiplier tubes situated as shown in FIGURES 1 or 2.

A photomultiplier 13 in accordance with FIGURE 1 may be connected to the phosphor or scintillization material 10 through an optical coupler of some type or the photomultiplier tube 13 may be connected directly to the scintillization material 10 by a suitable transparent glue of some type. The photomultiplier tubes, however, are preferably connected in the preferred manner disclosed in FIGURE 2. In this case, the photomultiplier tubes 19 and 21 are connected to a light coupler 28 which is constructed of a transparent material capable of transmitting light pulses to the photocathodes of photomultiplier tubes 19 and 21 with a minimum of attenuation of the light pulse. The light coupler 28 is connected by suitable means to the phosphor material 10. Thus, as the phosphor material 10 is bombarded by beta rays from the contamination material contained in the water vapor layer 31, the photomultiplier tubes 19 and 21 detect the light pulses generated in the phosphor 10 and produce an electric signal indicative of the light pulse. These electrical signals are amplified by amplifiers 22 and 23, respectively, and are utilized to activate a coincidence counter 24. In the event that photomultiplier tubes 19 and 21 simultaneously detect a light pulse generated in the phosphor material 10 as a result of a beta bombardment of the material, the amplifiers 22 and 23 will each produce an output which is detected by coincidence counter 24. This simultaneous occurrence of an electrical signal from the photomultiplier tubes 19 and 21 results in an output to integrator circuit 26 and recorder circuit 27. In this manner, a recording of the light pulse takes place. However, in the event that a sporadic signal is detected by a signal of the photomultipliers such as tube 19, a signal from tube 19 is amplified by amplifier 22 and is sent to coincidence counter 24, but since no signal arrives simultaneously from amplifier 23, coincidence counter 24 generates no output signal. Thus, a more accurate indication of the concentration of tritium oxide in the layer of water 31 is recorded by the system shown in FIGURE 2. As noted, the concentration of tritium oxide contamination in the water vapor layer 31 is directly related to the concentration of tritium oxide contamination in the air flowing past the cell 11. Consequently, the monitoring of the disintegrations or generation of beta ray energy in the layer 31 is, in reality, a detection or monitoring of the concentration of the contamination in the air flowing past cell 11.

To obtain a greater activity level on the surface of the scintillation or phosphor material 10, it is necessary to increase the effective thickness of the film 31 of water. This greater level of activity may be desirable in the event that the concentration of tritium oxide in the air flowing past cell 11 is very low. The thickness of the water vapor layer 31 may be controlled by controlling the temperature of the sorbent substrate 12. If the sorbent substrate 12 is cooled, the thickness of the water film collected is substantially increased. Cooling of the sorbent substrate 12 is accomplished by first cooling the photomultiplier tubes 19 and 21 and utilizing the principles of conduction to reduce the temperature of the sorbent 12. Conversely, if a layer of water 31 must be reduced in thickness, the temperature of the cell 11 and in particular the temperature of the sorbent 12 is increased by heating the cell to a desired temperature to produce the proper thickness of the water vapor layer 31.

The film thickness of water vapor layer 31 can also be controlled to a certain extent by the amount of salt or sorbent utilized per square centimeter on the surface of the phosphor material or it may be controlled by changing the effective surface area of the sorbent per square centimeter of the phosphor material surface. Increasing the film thickness to a value greater than the penetration distance of a maximum energy beta particle would be undesirable, however, because a reduction in the accuracy of the detection of the beta activity will result, due to the low energy level of beta particles. An undesirably thick film of water 31 requires that the tritium oxide from the air must diffuse through a greater thickness of the water before it is close enough to the scintillation material to produce a light pulse. This diffusion time, which necessarily results from an increasing thickness of the layer 31, results in an undesirable increase in the time constant of the system. The time constant is the lag time between the collection of the tritium oxide of a particular concentration level from the air and the time that a generated light pulse is recorded by the recorder 27 as a result of the bombardment of the phosphor material 10 by beta particles produced in the tritium oxide which represent the particular concentration. The time constant of the apparatus may be reduced, however, by alternately heating and cooling the substrate 12, thus driving off the film of water and reabsorbing a new film which corresponds to the ambient air in the level of beta activity monitored.

In order to reduce the physical bulk of the detection cell 11, it may be desirable to select a scintillation or phosphor material 10 which also exhibits the characteristics of collecting water vapor from the air as the water vapor flows past the cell 11. Zinc sulfide is such a material. If zinc sulfide is utilized, the cell 11 appears as in FIGURE 4. The light coupler 28 is simply connected to the layer of zinc sulfide opposite the water collecting surface. Such an arrangement increases the sensitivity of the overall apparatus if greater sensitivity is necessary for the monitoring device.

It is to be understood that the above-described arrangements are simply illustrative of the application of the principles of the invention. Numerous other arrangements may be readily devised by those skilled in the art which will embody the principles of the invention and fall within the spirit and scope thereof.

Now therefore, I claim:

1. A radiation monitoring apparatus which comprises means for sorbing water vapor containing radioactive contamination to form a thin layer of water containing said radioactive contamination, a radioactive radiation responsive scintillation material, said material having a surface coated with said sorbing means, said scintillation material being effective to generate light pulses indicative of the concentration of said contamination, a photoelectric multiplier means associated with said scintillation material for detecting said light pulses and means for correlating the quantity of said light pulses with the concentration of said radioactive contamination in said layer.

2. A radiation monitoring apparatus in accordance with claim 1 which further comprises:
    jacket means for containing said sorbing means, and
    means for flowing said water vapor into said jacket means past said sorbing means to continuously monitor the concentration of said radioactive contamination in said water vapor.

3. A radiation monitoring apparatus in accordance with claim 2 in which said sorbing means includes a thin layer of lithium chloride for forming said thin layer of radioactively contaminated water from said water vapor.

4. In an apparatus for detecting beta ray activity of a gas containing water vapor contaminated with beta ray emitting contamination, the combination of:
    a beta ray responsive scintillation material having a selected surface, and
    a thin layer of sorbent material formed on said selected surface for sorbing said contaminated water vapor to provide a thin layer of water containing said contamination on said scintillation material.

5. Apparatus in accordance with claim 4, which further includes:
    means for providing a constant flow of said gas to said detecting apparatus;
    chamber means receptive to said flow of said gas for mounting said scintillation material with said layer of sorbing material exposed to said gas and said water vapor; and
    means responsive to light pulses generated by said scintillation material in response to said contamination for generating an electrical signal indicative of the concentration of said contamination in said gas.

6. The method of continuously measuring radioactive contamination in a gas including water vapor contaminated with a radioactive contaminant, which comprises:
    sorbing said contaminated water vapor on a thin layer of sorbent material to form a thin layer of contaminated water;
    maintaining said sorbent material in said gas and water vapor to continuously exchange said thin layer of contaminated water with said contaminated water vapor so that the concentration of said contaminant in said thin layer of water is indicative of the concentration of said contaminant in said gas and water vapor; and
    supporting said thin layer of sorbent material on a selected surface of a scintillation detector to detect radioactive emissions from said contaminant in said water vapor sorbed by said sorbent material.

7. The method of detecting beta ray activity in air, wherein said air includes water vapor contaminated with a beta ray emitting contaminant, which comprises:
    sorbing said contaminated water vapor on a thin sorbent substrate provided on a selected surface of a scintillation material to render said material effective to produce light signals indicative of the concentration of said contamination in said sorbed water vapor, and
    continuously flowing said air and water vapor relative to said substrate to continuously exchange said water vapor in said air with said sorbed water vapor so that said light signals are continuously indicative of the beta ray activity in said air.

8. Apparatus according to claim 4, wherein said thin layer of sorbent material comprises lithium chloride.

9. In an apparatus for detecting beta ray activity of a gas containing water vapor contaminated with a beta ray emitting contamination, a cell for detecting the presence of said beta ray activity, which comprises:
    a thin layer of sorbent material for sorbing said contaminated water vapor to form a thin film of contaminated water, said thin layer having scintillating properties so that said beta rays emitted by said contamination in said film of water cause said thin layer to produce light pulses indicative of said beta ray activity.

10. Apparatus in accordance with claim 9 wherein said thin layer is fabricated from zinc sulfide.

References Cited by the Examiner
UNITED STATES PATENTS

| | | | |
|---|---|---|---|
| 2,629,253 | 2/1953 | Deaton | 73—29 |
| 2,892,091 | 6/1959 | Sawle | 250—43.5 |
| 3,076,093 | 1/1963 | Kiesel | 250—83.6 |
| 3,084,252 | 4/1963 | Goupil | 250—83.6 |
| 3,087,060 | 4/1963 | Omohundro | 250—71.5 |
| 3,116,414 | 12/1963 | Wilson | 250—83.6 |

OTHER REFERENCES

Counting Soft Betas by Christman, Nucleonics, vol. 19, No. 5, May 1961, pp. 51–55 and 64.

Liquid Scintillation Beta Counter for Radioactive Solids by Bluh et al., Nucleonics, vol. 10, No. 9, September 1952, pp. 48–51.

Liquid Scintillation Counting for Assay of Tritium in Urine, by Okita et al., Nucleonics, vol. 14, No. 3, March 1956, pp. 76–79.

RALPH G. NILSON, *Primary Examiner.*

J. W. LAWRENCE, A. R. BORCHELT,
*Assistant Examiners.*